(12) United States Patent
Chamlin

(10) Patent No.: US 11,897,433 B2
(45) Date of Patent: Feb. 13, 2024

(54) HITCH MOUNTED TREE CARRIER FOR A MOTOR VEHICLE

(71) Applicant: Jonathan Miller Chamlin, Peru, IL (US)

(72) Inventor: Jonathan Miller Chamlin, Peru, IL (US)

(73) Assignee: Jonathan Miller Chamlin, Peru, IL (US)

( * ) Notice: Subject to any disclaimer, the term of this patent is extended or adjusted under 35 U.S.C. 154(b) by 0 days.

(21) Appl. No.: 17/689,959

(22) Filed: Mar. 8, 2022

(65) Prior Publication Data

US 2022/0340088 A1    Oct. 27, 2022

Related U.S. Application Data

(60) Provisional application No. 63/158,133, filed on Mar. 8, 2021.

(51) Int. Cl.
*B60R 9/06* (2006.01)

(52) U.S. Cl.
CPC ..................... *B60R 9/06* (2013.01)

(58) Field of Classification Search
CPC ........................................................ B60R 9/06
USPC ........................................................ 224/519
See application file for complete search history.

(56) References Cited

U.S. PATENT DOCUMENTS

| | | | | |
|---|---|---|---|---|
| 3,302,909 A * | 2/1967 | Glassman | ............... | A47G 33/12 248/524 |
| 5,070,678 A * | 12/1991 | Morrill | ................... | B65B 25/02 414/490 |
| 5,800,294 A * | 9/1998 | Naecker, Jr. | ......... | A63B 63/083 473/483 |
| 6,260,335 B1 * | 7/2001 | Helinski | ................. | B65B 25/02 53/390 |
| 6,983,921 B1 * | 1/2006 | Rahmer | ............. | A47G 33/1226 47/40.5 |
| D530,246 S * | 10/2006 | Shipman | ..................... | D12/162 |
| 8,047,384 B2 * | 11/2011 | Mrowiec | .................. | E01F 9/70 211/44 |
| 9,004,295 B2 * | 4/2015 | Dovner | .................... | B62H 3/12 211/17 |
| 9,211,846 B2 * | 12/2015 | Donnigan | ................. | B60R 9/08 |
| 9,744,912 B1 * | 8/2017 | Nobert | .................... | B60R 11/00 |
| 10,307,634 B2 * | 6/2019 | Young | .................. | A63B 71/023 |
| 10,420,292 B1 * | 9/2019 | Ehlers | ..................... | B25B 5/068 |
| 2012/0235012 A1 * | 9/2012 | Andrassy | ............... | A47G 33/12 248/523 |

(Continued)

*Primary Examiner* — Peter N Helvey
(74) *Attorney, Agent, or Firm* — Barnes & Thornburg LLP

(57) ABSTRACT

A hitch mounted tree carrier is configured to be secured to a motor vehicle and permits a user to transport a tree from a first location to a second location. The hitch mounted tree carrier includes an elongated member configured to be removably received by a motor vehicle hitch and a receptacle having a front portion and a rear portion, wherein the front portion is affixed to the elongated member. The hitch mounted tree carrier also includes: (i) a wedge positioned in the receptacle and configured to apply a first force on a first extent of a tree trunk, when the tree is in the process of being inserted into the receptacle, and (ii) a securement assembly extending into the receptacle and configured to apply a second force on a second extent of the tree trunk, when the tree is in an engaged state.

20 Claims, 12 Drawing Sheets

(56) References Cited

U.S. PATENT DOCUMENTS

| | | | |
|---|---|---|---|
| 2014/0105718 A1* | 4/2014 | Person | A01G 23/099 |
| | | | 414/800 |
| 2016/0243996 A1* | 8/2016 | Anton | B60R 9/06 |
| 2018/0020859 A1* | 1/2018 | Rapp | A47G 33/1226 |
| | | | 248/516 |
| 2018/0022287 A1* | 1/2018 | Sorey | B60R 9/06 |
| | | | 224/519 |
| 2018/0134227 A1* | 5/2018 | Klar | B60R 9/058 |

* cited by examiner

HITCH MOUNTED TREE CARRIER FOR A MOTOR VEHICLE

PRIORITY CLAIM

This application claims the benefit of U.S. Provisional Application Ser. No. 63/158,133, which was filed on Mar. 8, 2021 and is incorporated by reference in their entirety for all purposes.

TECHNICAL FIELD

The present disclosure relates to a hitch mounted tree carrier for a motor vehicle. More specifically, the hitch mounted carrier is configured to be removably coupled to a motor vehicle to permit a user to transport a tree, such as a Christmas tree, from one location (e.g., the location where the tree was purchased) to a second location (e.g., the user's home, apartment or business).

BACKGROUND OF THE INVENTION

The inventive hitch mounted tree carrier is configured to be removably coupled to a motor vehicle to permit a user to transport a holiday tree, such as a Christmas tree, from one location—such as the location where the tree was purchased—to a second location—such as the user's home, apartment or business where the tree is removed from the carrier for decoration and display. The inventive receiver hitch mounted carrier makes it considerably easier and more convenient to transport a Christmas tree to a user's home while not damaging the tree or the vehicle by placing it onto the vehicle's roof and removing it from its roof. Examples of damage include, but are not limited to, the tree scratching the vehicle, tree sap remaining on the vehicle's paint or trim surface, or tree needles dropping into and remaining in the vehicle. The carrier further allows for the transport of heavy materials in the nursery bucket while not requiring the user to lift the materials into the tailgate, which is located farther away from the ground than the receiver hitch. This requires less effort and improves ergonomics.

The description provided in the background section should not be assumed to be prior art merely because it is mentioned in or associated with the background section. The background section may include information that describes one or more aspects of the subject of technology.

BRIEF DESCRIPTION OF THE DRAWINGS

The drawing figures depict one or more implementations in accord with the present teachings, by way of example only, not by way of limitation. The figures, like reference numerals, refer to the same or similar elements.

DETAILED DESCRIPTION

Figure 1:
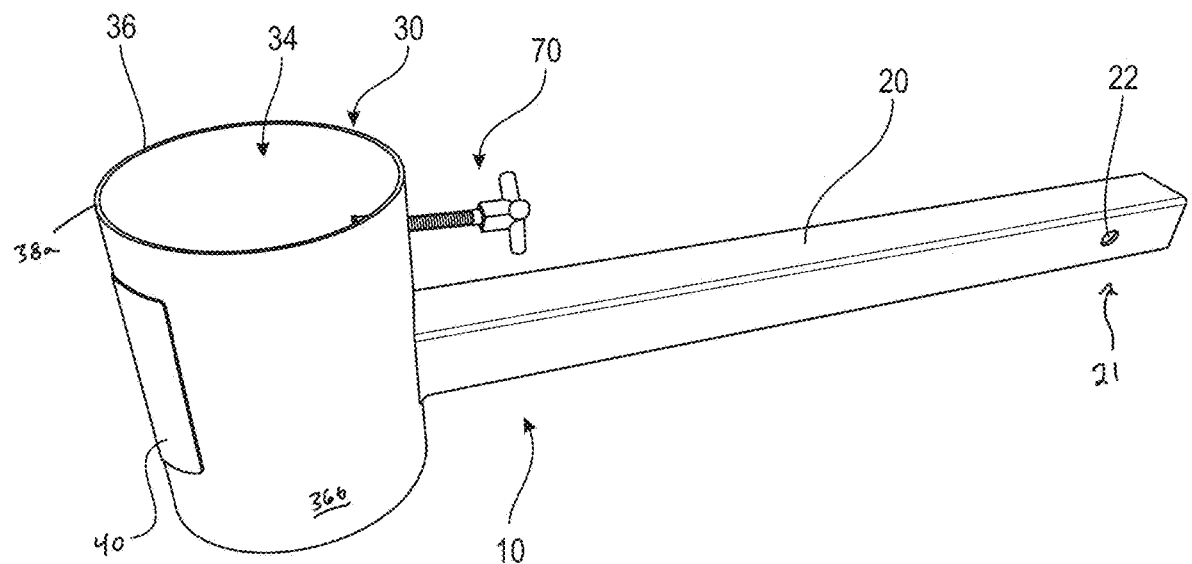
FIG. 1 is a perspective view of a first embodiment of a hitch mounted tree carrier.

In the following detailed description, numerous specific details are set forth by way of examples in order to provide a thorough understanding of the relevant teachings. However, it should be apparent to those skilled in the art that the present teachings may be practiced without such details. In other instances, well-known methods, procedures, components, and/or circuitry have been described at a relatively high-level, without detail, in order to avoid unnecessarily obscuring aspects of the present disclosure.

This disclosure includes several embodiments of hitch mounted carriers in different forms with the understanding that the present disclosure is to be considered as an exemplification of the principles of the disclosed methods and systems and is not intended to limit the broad aspects of the disclosed concepts to the embodiments illustrated. As will be realized, the disclosed methods and systems are capable of other and different configurations, and several details are capable of being modified all without departing from the scope of the disclosed methods and systems. For example, one or more of the following embodiments, in part or whole, may be combined consistent with the disclosed methods and systems. Accordingly, the drawings and detailed description are to be regarded as illustrative in nature and not restrictive or limiting.

FIGS. 1-7 show a first embodiment of an inventive hitch mounted tree carrier 10. Said hitch mounted tree carrier 10 is configured to be removably coupled to a motor vehicle 500 to permit a user to transport a tree T (e.g., a Christmas tree) from a first location—such as the location where the tree was purchased—to a second location—such as the user's home, apartment or business where the tree T is removed from the carrier 10. As described below, carrier 10 is configured to be removably coupled to a hitch 510, which is attached to the motor vehicle 500. A receptacle 30 of carrier 10 is designed to receive the trunk or base B of the tree T and a securement assembly 70 can engage an extent of the tree T to secure said tree T in the receptacle 30 in a substantially vertical position. Once the tree T is secured in receptacle 30, the motor vehicle 500 can be driven from the first location to the second location. Once at the second location, the securement assembly 70 can be disengaged from the tree T, and said tree T can be removed from receptacle 30. The inventive hitch mounted tree carrier 10 makes transporting the tree T to a user's home considerably easier and more convenient while not damaging the tree or the motor vehicle 500. FIGS. 8-21 show alternative embodiments and/or accessories that can be utilized instead of or in addition to the first embodiment of the hitch mounted carrier 10 shown in FIGS. 1-7.

Referring to FIGS. 1-7, the hitch mounted tree carrier 10 includes: (i) an elongated member 20, and (ii) a receptacle 30 that includes a securement assembly 70. The elongated member 20 is configured to be removably inserted into the receiver (not shown) of the hitch 510, which is affixed to a motor vehicle 500. To ensure that the receptacle 30 is positioned an appropriate distance away (e.g., between 0.25 and 4 feet) from the motor vehicle 500 and can be removably coupled to the hitch, the elongated member 20 preferably has a rectangular prism configuration that is designed to be received by the receiver of the hitch 510. Said rectangular prism configuration may be consistent or may vary (e.g., rectangular to circular) across the length and/or width of the elongated member 20. Additionally, the elongated member 20 may be tubular, solid, or vary between tubular and solid across the length and/or width of the elongated member 20. Further, the thicknesses of the side walls of the elongated member 20 may be consistent or may vary across the length and/or width of the elongated member 20.

The cross-sectional shape of the elongated member 20 for at least a mating portion 21 of the member 20 is configured to substantially match the shape of the receiver of the hitch 510. For example, if the receiver has a square shape, the mating portion 21 of the elongated member 20 has a matching square cross-sectional shape. Additionally, the cross-sectional size of the mating portion 21 of the elongated member 20 is sized to be just smaller than the cross-sectional size of the receiver. For example, if the receiver has an internal cross-sectional height and width that is 2 inches by 2 inches, then the mating portion 21 of the elongated member 20 has external cross-sectional height $M_H$ and width $M_W$ that is approximately or just less than 2 inches by 2 inches. As the size of the cross-sectional shape of the receiver may change between 1.25 inches by 1.25 inches, 2 inches by 2 inches, 2.5 inches by 2.5 inches, 3 inches by 3 inches, or any other sizes between 0.25 inches and 5 inches, the size of the cross-sectional shape of the mating portion 21 of the elongated member 20 may also change between approximately or just less than 1.25 inches by 1.25 inches, 2 inches by 2 inches, 2.5 inches by 2.5 inches, 3 inches by 3 inches, or any other sizes between 0.25 inches and 5 inches. In other words, the cross-sectional shape of the mating portion 21 of the elongated member 20 substantially matches the size and shape of the receiver.

To facilitate the removable coupling of the elongated member 20 and the hitch 510, the elongated member 20 includes a pair of aligned openings 22 that receive a pin (not shown) to couple the carrier 10 to the hitch 510. Said pin is designed to be inserted from one side of the hitch 510 through aligned openings 22 and into an opening formed on the other side of the hitch 510. This configuration ensures that the elongated member 20 cannot be removed from the hitch 510 without removing the pin. Said pin may be coupled to the elongated member 20 via a tether to help ensure that the pin remains with the carrier 10. See FIG. 8. In other embodiments, the elongated member 20 can be coupled to the hitch 510 or another extent of the motor vehicle 500 in other known manners. For example, the elongated member 20 may be coupled to the vehicle's bumper, tailgate, trunk, or any other known method of coupling an apparatus to a rear extent of a vehicle.

Figure 3:
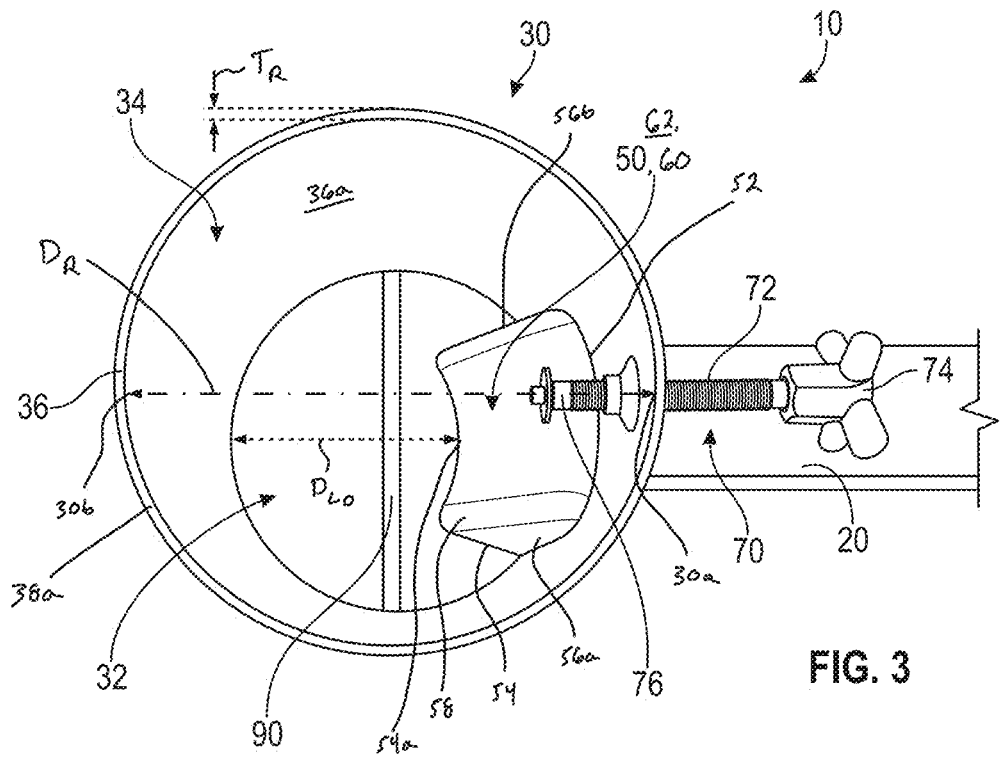
FIG. 3 is a top view of the hitch mounted tree carrier of FIG. 1.
Figure 4:
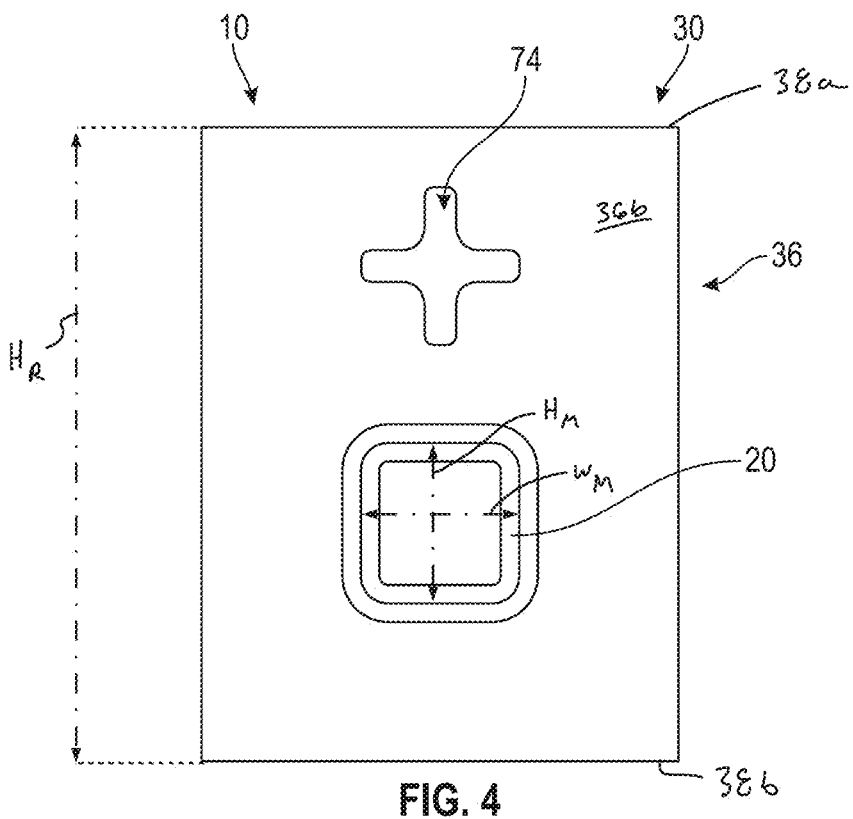
FIG. 4 is a front end view of the hitch mounted tree carrier of FIG. 1.
Figure 5:
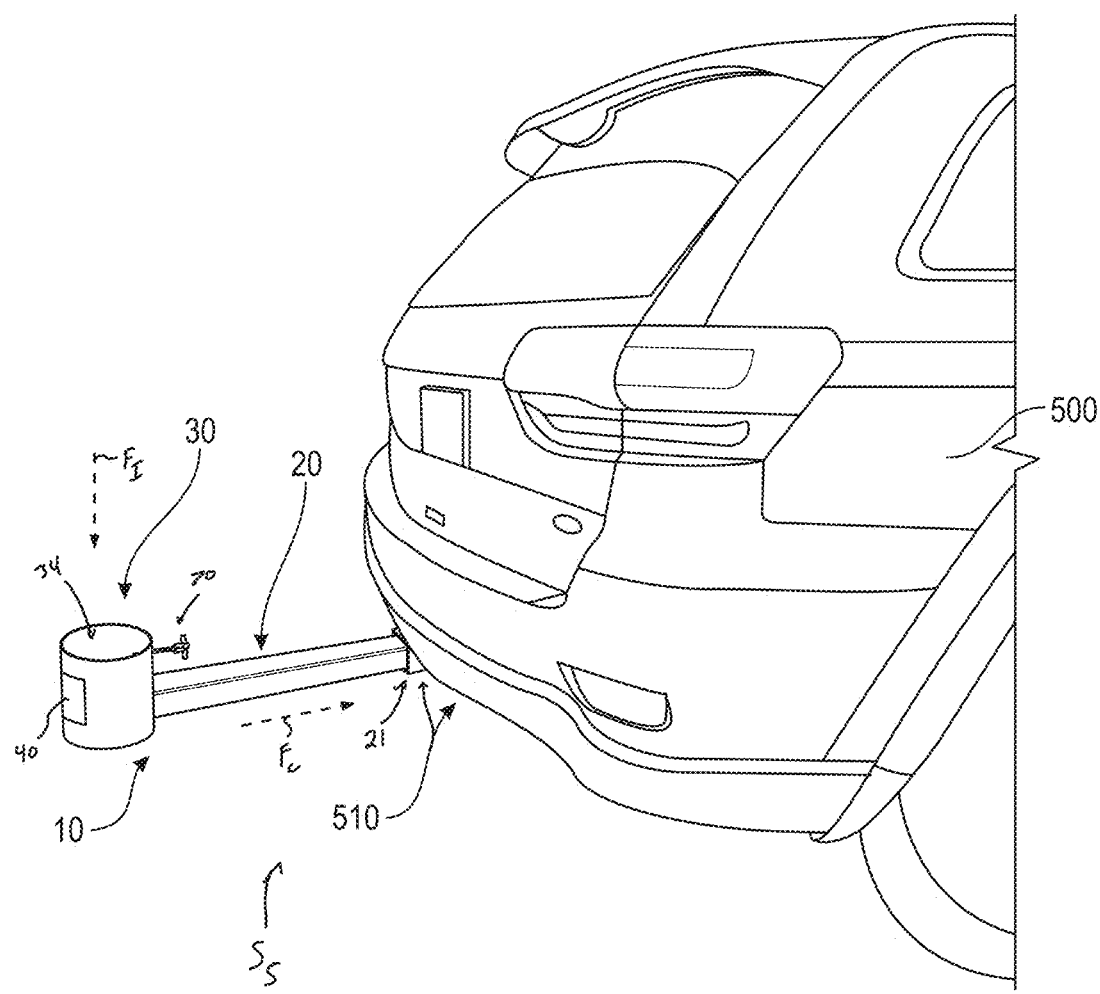
FIG. 5 is a perspective view of the hitch mounted tree carrier of FIG. 1, showing the hitch mounted tree carrier coupled to a vehicle in an installed position.
Figure 6:
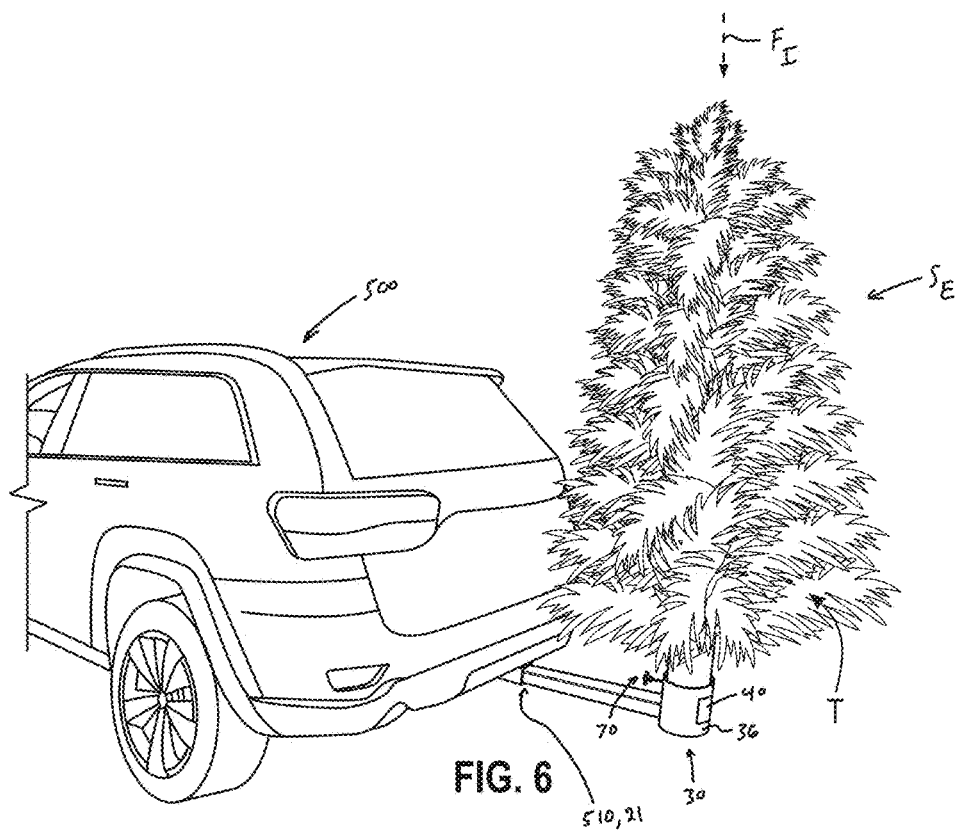
FIG. 6 is a perspective view of the hitch mounted tree carrier of FIG. 1, showing a holiday tree residing within the hitch mounted tree carrier.
Figure 7:
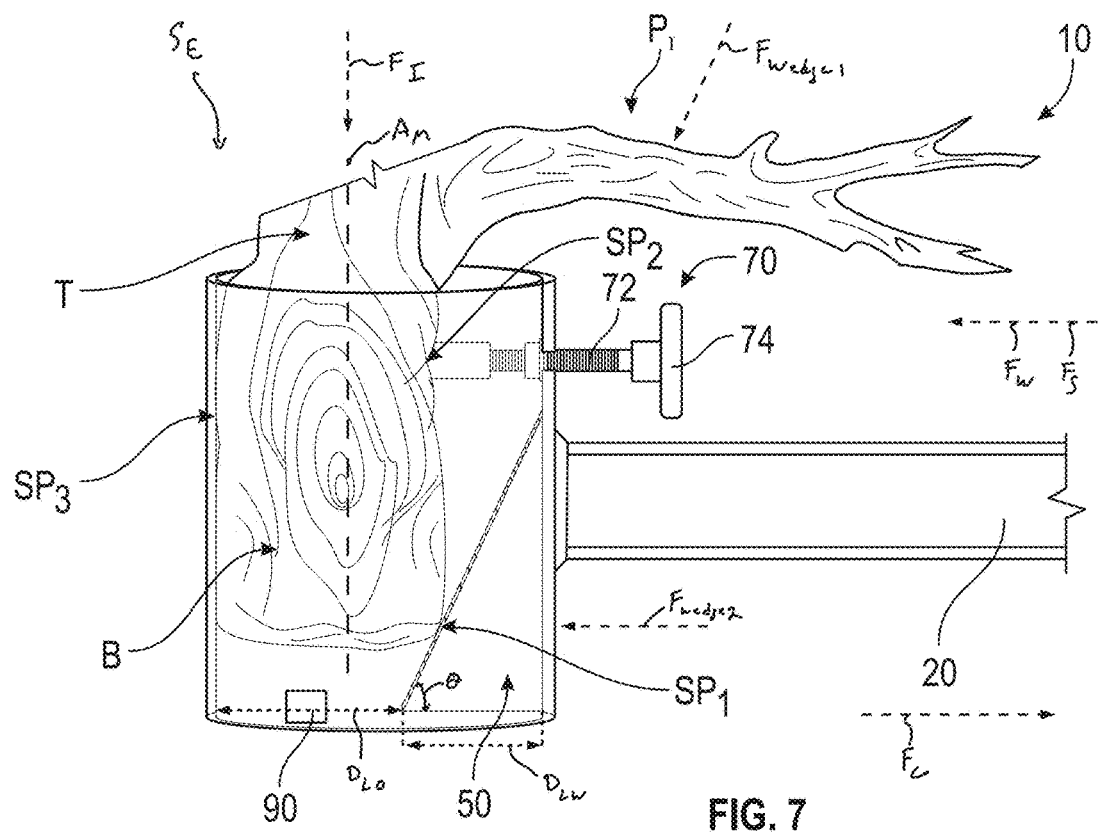
FIG. 7 is a side view of the hitch mounted tree carrier of FIG. 1, wherein the receiver is shown in a transparent state in order to illustrate how a holiday tree would reside in the hitch mounted tree carrier.

As best shown in FIGS. 6 and 7, the receptacle 30 is designed to receive an extent—namely, the base or trunk B—of the tree T. Referring to FIG. 3, the receptacle 30 includes a sidewall 36 that has: (i) an external surface 36b that is connected to the elongated member 20, (ii) a height $H_R$ that extends from an upper edge 38a to a lower edge 38b, (iii) a thickness $T_R$, and (iv) a diameter $D_R$ that extends from a frontal extent 30a to an inner rear extent 30b. The receptacle 30 may be originally separately formed from the elongated member 20 and then connected thereto or the receptacle 30 may be integrally formed (e.g., casting or injection molded) with the elongated member 20. As such, the receptacle 30 may be mechanically, chemically, or both mechanically and chemically coupled to the elongated member 20. For example, the receptacle 30 may be formed separate from the elongated member 20, and then the exterior surface 36b may be welded to the elongated member 20. The height $H_R$ of the sidewall 36 may be between 1 inch and 14 inches and preferably 8 inches, while the thickness $T_R$ of the sidewall 36 may be between 0.0625 inches and 2 inches and preferably 0.125 inches. Said height $H_R$ and thickness $T_R$ are selected to ensure that the receptacle 30 can secure the tree T to the vehicle in a substantially vertical position when the wind force $F_W$ acts upon the tree T when the vehicle 500 is moving down the road. The diameter $D_R$ of the receptacle 30 may be between 2 inches to 10 inches and preferably 6 inches. Said diameter $D_R$ of the receptacle 30 should be large enough (e.g., greater than 3 inches) to enable a majority of the trees T can be received within the receptacle 30.

Figure 2:
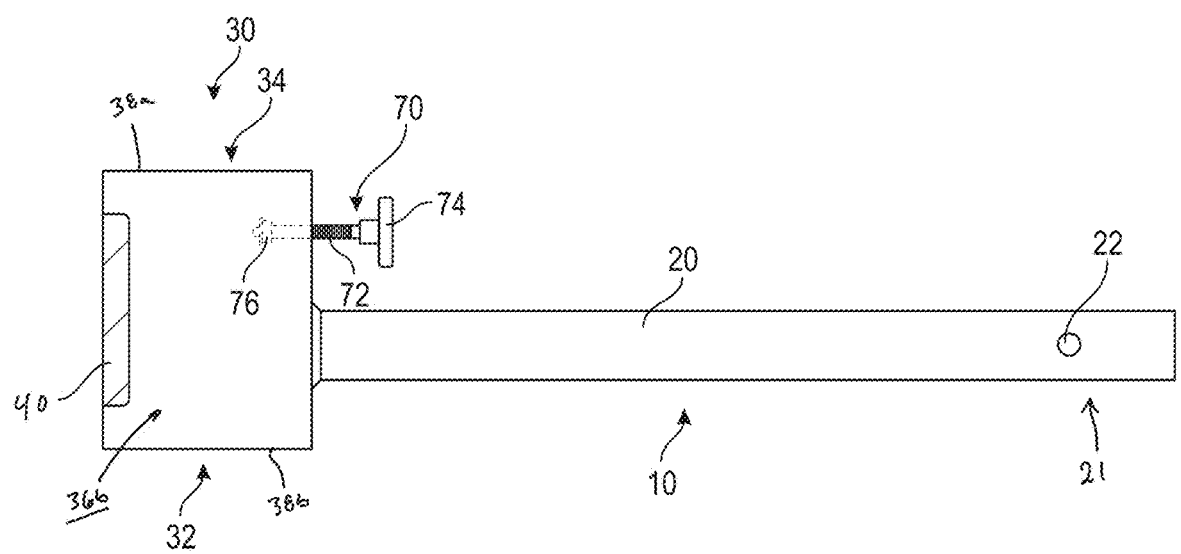
FIG. 2 is a side view of the hitch mounted tree carrier of FIG. 1.

The sidewall 36 of the receptacle 30 is preferably cylindrical because the tree T also has a substantially cylindrical trunk, whereby a rear extent of the receptacle 30 may match the curvature of a rear extent of the tree T when the tree T is inserted into the receptacle 30. However, in other embodiments, the receptacle 30 may have a side wall arrangement that is comprised of a plurality of side walls, wherein the side walls may form any shape (e.g., square, rectangular, triangular, etc.). The receptacle 30 also includes a lower opening 32 and an upper opening 34. The upper opening 34 is designed to allow for the tree T to be inserted into the receptacle 30, while the lower opening 32 may be fully obscured, partially obscured, or not obscured. As shown in FIGS. 1 and 2, the receptacle 30 can include a reflector 40 that improves the visibility of the carrier 10, especially when it is connected to the hitch 510 of the vehicle 500, to others driving, walking or standing behind the vehicle 500.

An internal wedge 50 may be coupled to or integrally formed an interior surface 36a of the side wall 36 of the receptacle 30 and partially obscure the lower opening 32 of the receptacle 30. Said internal wedge 50 is designed and configured to reduce the size of the lower opening 32 in comparison to the upper opening 36 and force at least a lower extent of the tree T towards the rear extent 30b of the inner surface 36a of the receptacle 30. This is beneficial because it helps ensure that the tree T remains in the receptacle 30 when the vehicle 500 is moving. For example, said configuration helps prevent the base of the tree T from being angled rearward and pulled from the receptacle 30 via the wind force $F_W$, when the securement assembly 70 is not fully engaged with the tree T. Instead, the wedge 50 helps ensure that the tree T is angled forward or towards the vehicle 500, when the securement assembly 70 is not fully engaged with the tree T, thereby allowing wind force to move the tree T from this forward angled arrangement to a substantially vertical arrangement.

The internal wedge 50 may include: (i) an upper edge 52, (ii) a lower edge 54, (iii) opposed side walls 56a, 56b, (iv) rounded shoulders 58, and (v) a sloped or ramped wall 60 with an external surface 62. The upper edge 52 may be: (i) flush with the internal surface 36a of the side wall 36, and (ii) positioned between 1% (e.g., 0.08 inches below the upper the upper edge 38b of the side wall 36) and 80% (e.g., 6.4 inches below the upper the upper edge 38b of the side wall 36) below the upper edge 38a of the side wall 36 and preferable 37.5% (e.g., 3 inches below the upper the upper edge 38b of the side wall 36) below the upper edge 38a of the side wall 36. This arrangement is beneficial because it minimizes the size of the wedge and helps ensure that the tree T makes contact with the sloped or ramped wall 60 and is not positioned on top of a ledge that is formed by an upper extent of the wedge 50. However, in other embodiments, the upper edge 52 may not be flush with the internal surface 36a of the side wall 36 or may be positioned adjacent to or flush with the upper edge 38a of the side wall 36. The lower edge 54 of the wedge 50 may be aligned with or adjacent to the lower edge 38b of the side wall 36. This configuration is preferable because the wedge 50 will be protected from objects that may impact the lower extent of the receptacle 30 and it will help ensure that the tree T will be inserted as far as possible within the receptacle 30. In other embodiments, the lower edge 54 of the wedge 50 may be positioned above the lower edge 38b of the side wall 36, such that another object (e.g., retaining element 90) can be positioned between the lower edge 64 and the lower edge 38b.

The opposed side walls 56a, 56b extend outward from the inner surface 36a of the side wall 36 at an angle that is approximately 90 degrees. The opposed side walls 56a, 56b are triangular shaped, wherein their upper extents come to a point that is substantially flush with an extent of the inner surface 36a and their lower extends are positioned a substantial extent away from the inner surface 36a. This configuration enables the rounded shoulders 58 and the sloped or ramped wall 60 to be sloped relative to the vertical side wall 36. As shown in FIG. 7, the angle theta θ between the lower edge 54 and the sloped wall 60 is between 30 degrees and 80 degrees, preferably 65 degrees. The sloped wall 60 may be configured such that its external surface 62 is flat/planer, concave, or convex. Preferably, the external surface is concave, as this allows the surface 62 to match an extent of the radius of the tree T. In other embodiments, the wedge 50 may be omitted, larger, or smaller.

Including the wedge 50 within the receptacle 30 reduces the size of the lower opening 32. In the embodiment shown in FIGS. 1-7, the lower frontal edge 54a of the wedge 50 is positioned approximately 2.5 inches from the frontal extent 30a of the inner surface 36a and approximately 4.5 inches from the rear extent 30b of the inner surface 36a. In other words, the lower opening distance $D_{LO}$ between the lower frontal edge 54a and the rear portion 30b of the inner surface 36a is approximately 4.5 inches, while the lower wedge distance Dim between the lower frontal edge 54a and the frontal portion 30a of the inner surface 36a is approximately 2.5 inches. As such, the wedge 50 in this embodiment reduces the lower opening 32 from 6 inches to less than 4.5 inches, which is about a 40% reduction in the size of the opening 32. In other words, the size of the lower opening 32 is 40% less than then the size of the upper opening 34. This reduction in size from the upper opening to the lower opening is beneficial because it ensures that the receptacle 30 can receive a larger tree T trunk, while supporting a bottom extent of the tree T. In other embodiments, the lower wedge distance Dim (e.g. between 2.6 inches to 6 inches) may be increased and the lower opening distance $D_{LO}$ (e.g. between 0 inches to 3.4 inches) may be decreased or the lower wedge distance Dim (e.g. between 0 inches to 2.4 inches) may be decreased and the lower opening distance $D_{LO}$ (e.g. between 4.6 inches to 6 inches) may be increased. In these alternative embodiments, the reduction of the lower opening 32 in comparison to the upper opening 34 may be between 0% and 100%.

Like the wedge 50, a retaining element 90 may be coupled to or integrally formed an interior surface 36a of the side wall 36 of the receptacle 30 and partially obscure the lower opening 32 of the receptacle. Unlike the wedge 50, the retaining element 90 is not designed to force a lower extent of the tree T towards the rear extent 30b of the inner surface 36a of the receptacle 30. Instead, the retaining element 90 is designed to ensure that the tree T's lowest extent does not extend past the lower edge 38b of the side wall 36 of the receptacle 30. This may be desirable to ensure that the lowest extent of the tree T does not extend past the receptacle 30 and contact the ground while the vehicle 500 is moving. In this the embodiment, the retaining element 90 is a rod 92 that extends laterally across the lower opening 32 and is substantially perpendicular to lower opening distance $D_{LO}$. This configuration may be beneficial because it allows the retaining element 90 to be directly coupled to or integrated with the side wall 36. This configuration may be more robust than coupling the retaining element 90 to the wedge 50, wherein the wedge 50 is coupled to the side wall 36. It should be understood that in other embodiments, the retaining element 90 may be omitted, may have a different configuration (e.g., net, perforated sheet, multiple structures, etc.), or may be solid.

The securement assembly 70 is configured to engage an extent of the trunk B when the tree T is placed in the receptacle 30. The securement assembly 70 includes: (i) an elongated fastener 72, (ii) an external actuator 74, (iii) an internal engagement member 76, and (iv) a threaded receiver 78 formed in the side wall 36 of the receptacle 30. The elongated fastener 72 is a threaded bolt that is coupled to both the external actuator 74 and the internal engagement member 76. As shown in the Figures, the external actuator 74 has a cross-shaped configuration, which is configured to be grasped and actuated by a user. Said cross-shaped configuration is beneficial because it allows the user to apply sufficient pressure on the said external actuator 74 to ensure that the securement assembly 70 properly engages the tree T.

In other embodiments, the external actuator 74 may have other configurations (e.g., T-shaped, a circle with detents, etc.).

The internal engagement member 76 may be a nut or another structure that can interact with the elongated fastener 72 and help ensure that said fastener 72 is not forced into the tree T by the user. As such, the internal engagement member 76 has an end 76a whose area is larger than the area of the end of the fastener 72. Finally, the threaded receiver 78 formed in the side wall 36 of the receptacle 30 is configured to receive an extent of the elongated fastener 72. The threaded receiver 78 may be formed by threading an opening formed in the side wall 36 or may be formed by aligning one or more threaded nuts with an opening formed in the side wall 36 and attaching said nuts to the side wall 36. In other embodiments, the securement assembly 70 may have other configuration and may use other structures. For example, the securement assembly 70 may utilize a ratcheting system, lever and clamp mechanism, or any other known mechanical securing means.

To use the carrier 10, the user first inserts the mating portion 21 of the elongated member 20 into the receiver of the hitch 510 using a coupling force Fc. Once the mating portion 21 of the elongated member 20 is inserted into the receiver, the user aligns the openings 22 with the openings formed in the hitch 510 and inserts the pin through the four openings. Once the pin is inserted in through the openings, the carrier 10 is secured to the vehicle 500 to form a secured state $S_S$. It should be understood that the use of other embodiments of the carrier 10 may require additional steps (e.g., plugging the hitch into the power outlet, hooking up the tethers to the chain locations of the hitch, etc.) to secure said carrier 10 to the vehicle 500.

Once the carrier 10 is in the secured state $S_S$, the tree T can be inserted into the receptacle 30 to move the system from secured state $S_S$ to a fully inserted or supported state $S_{SU}$. In doing so, the base B of the tree T is inserted through the upper opening 34, past the upper edge 38a of the side wall 36, and makes contact with the external surface 62 of the sloped wall 60 of the wedge 50. During this insertion process, the sloped wall 60 of the wedge 50 applies a first force or a first wedging force $F_{wedge1}$ on a first lower extent of the tree trunk or base B. Once the tree T is fully inserted into the receptacle 30, contact between the external surface 62 of the sloped wall 60 provides the first support point $SP_1$ to a first lower extent of the trunk B. As the base B of the tree T is inserted downward via the insertion force/gravitational force Fi, the first wedging force $F_{wedge1}$ force the angle of the tree towards the vehicle 500 at an angle that is approximately equal to the angle of the wall 60. In this first embodiment, the base B of the tree T will form an interior angle with the top surface of the elongated member 20 that is approximately 65%. The first wedging force $F_{wedge1}$ will continue to force the base B towards the internal rear surface of the receptacle 30, while the insertion force/gravitational force Fi will continue forcing the base B downward at a direction that is substantially perpendicular to the top surface of the elongated member 20 (assuming that the vehicle 500 is parked on a surface that is level and parallel with the horizon). Depending on the size of the base B, the tree T may either: (i) be supported by contact between the lower frontal edge of the base B in contact with the sloped wall 60 and the lower rear edge of the base B in contact with an extent of the internal rear surface of the side wall 36, or (ii) be supported by contact between the frontal extent of the base B in contact with the sloped wall 60 and the bottom surface of the base B in contact with the retaining element 90. Once the tree T is supported in any one of these positions, the tree T is in the fully inserted or supported state $S_{SU}$.

To move the system from the fully inserted or supported state $S_{SU}$ to a retained or engaged state $S_E$, the user rotates the actuator 74 to displace the elongated fastener 72 and the engagement member 76 towards the base B of the tree T. The interaction between the internal engagement member 76 and the second extent of the trunk B causes the tree T to angularly displaced around first support point $SP_1$ in order to alter the angle of the tree T from substantially matching the angle of the sloped wall 60 to matching the orientation of the inner surface of the side wall 36. Said angular displacement continues because the user continues to rotate the actuator 74 to displace the elongated fastener 72 towards the base B of the tree T until a rear extent of the tree T is placed in contact with a rear extent of the inner surface 36a of the receptacle 30, wherein said tree T is orientated substantially perpendicular with the top surface of the elongated member 20. Once the contact between the rear surfaces is made or the tree T has a substantially vertical orientation, the securement assembly 70 provides a second support point $SP_2$ for the tree T in the retained or engaged state $S_E$. In this configuration, said: (i) securement assembly 70 exerts a second or securement force $F_S$ on the second lower extent of the trunk B of the tree T that is directed away from the front portion 30a of the receptacle 30 and towards the rear portion 30b of the receptacle 30, and (i) the wedge 50 exerts a third or second wedging force $F_{wedge2}$ force on the first extent of the trunk B of the tree T that is directed away from the front portion 30a of the receptacle 30 and towards the rear portion 30b of the receptacle 30. Said second force and the third force are substantially aligned. In other words, the tree T has a substantially vertical orientation when the vehicle 500 is parked on a level surface parallel with the horizon and the system is in the retained or engaged state $S_E$.

The wedge 50 and the securement assembly 70 collectively exert a combined force, that is substantially equivalent to the sum of the second wedging force $F_{wedge2}$ and the securement force $F_S$, on the trunk B of the tree T that is directed away from the front portion 30a of the receptacle 30 and towards the rear portion 30b of the receptacle 30. Engagement of the trunk B of the tree T and the rear portion 30b of the receptacle 30 provides a third support point $SP_3$ for the tree T in the retained or engaged state $S_E$. In other words, the wedge 50 and the securement assembly 70 collectively exert a combined rearward force on the trunk B whereby the rear portion 30b of the receptacle 30 provides the third support point $SP_3$ for the tree T in the engaged state $S_E$. Depending upon the size of the trunk B, the retaining element 90 may provide a fourth support point $SP_4$ for the tree T in the engaged state $S_E$.

Once the system is in the retained or engaged state $S_E$, the user may move the vehicle 500 from a first location—such as the location where the tree was purchased—to a second location—such as the user's home, apartment or business. When the vehicle 500 is moving between these locations in a forward direction, a rearward directed wind force $F_W$ is exerted on the tree T. And wherein at least an extent of the aerodynamic drag force or wind force $F_W$ is orientated: (i) parallel with the securement force $F_S$, and (ii) perpendicular with the insertion force/gravitational force Fi and the major axis of the tree T. However, the third support point $SP_3$ supports the rear extent of the tree T, while the first and second support points $SP_1$, $SP_2$ help support the front extent of the tree T. The combination of these support points $SP_1$, SP$_2$, SP$_3$ should be great enough to enable the tree T to travel at freeway speeds without being dislodged from the receiver 30.

Figure 8:
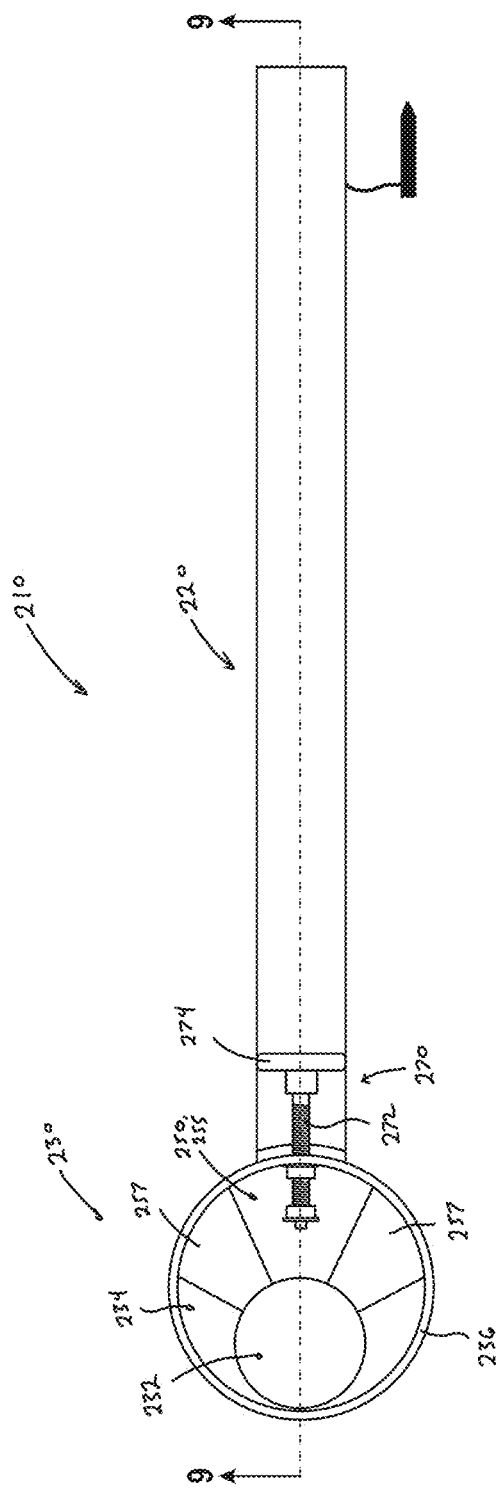
FIG. 8 is a top view of a second embodiment of a hitch mounted tree carrier.
Figure 9:
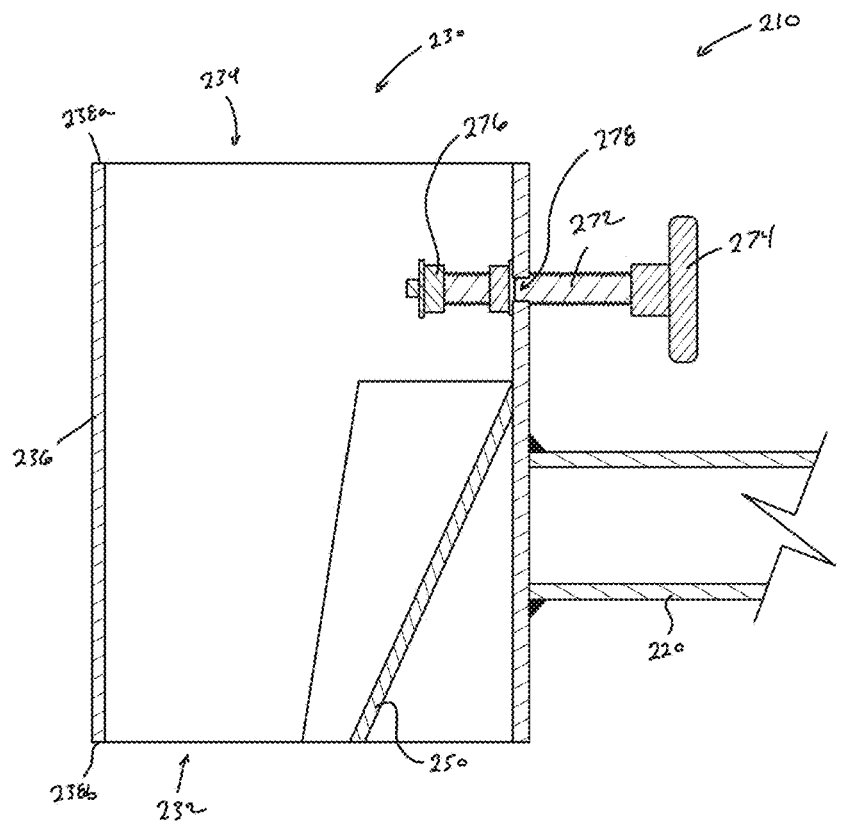
FIG. 9 is a cross-sectional view of the hitch mounted tree carrier taken along line 9-9 of FIG. 8.

Similar to the carrier 10, FIGS. 8-9 show an additional embodiment of the carrier 210. For the sake of brevity, the above disclosure in connection with carrier 10 will not be repeated below, but it should be understood that across embodiments like numbers represent like structures. In particular, like structure have like reference numbers that are separated by an interval of 200. For example, the disclosure relating to the receptacle 30 applies in equal force to receptacle 230. Moreover, it is to be understood that any one or more features of the carrier 10 can be used in conjunction with those disclosed regarding the carrier 210, and that anyone or more features of the carrier 210 can be used in conjunction with those disclosed regarding the carrier 10. In this embodiment, the carrier 210 features a wedge 250 with a different configuration than the wedge 50. As shown in FIGS. 8 and 9 (cross-section from FIG. 8), the wedge 250 has an inner surface 255 and opposed side walls 257 that flank the inner surface 255 and define a gradually sloped linear surface while tapering and returning to the inner surface of the sidewall 236 of the receptacle 230. As such, the rounded shoulders 58 of wedge 50 and the retaining element 290 are omitted.

Figure 10:
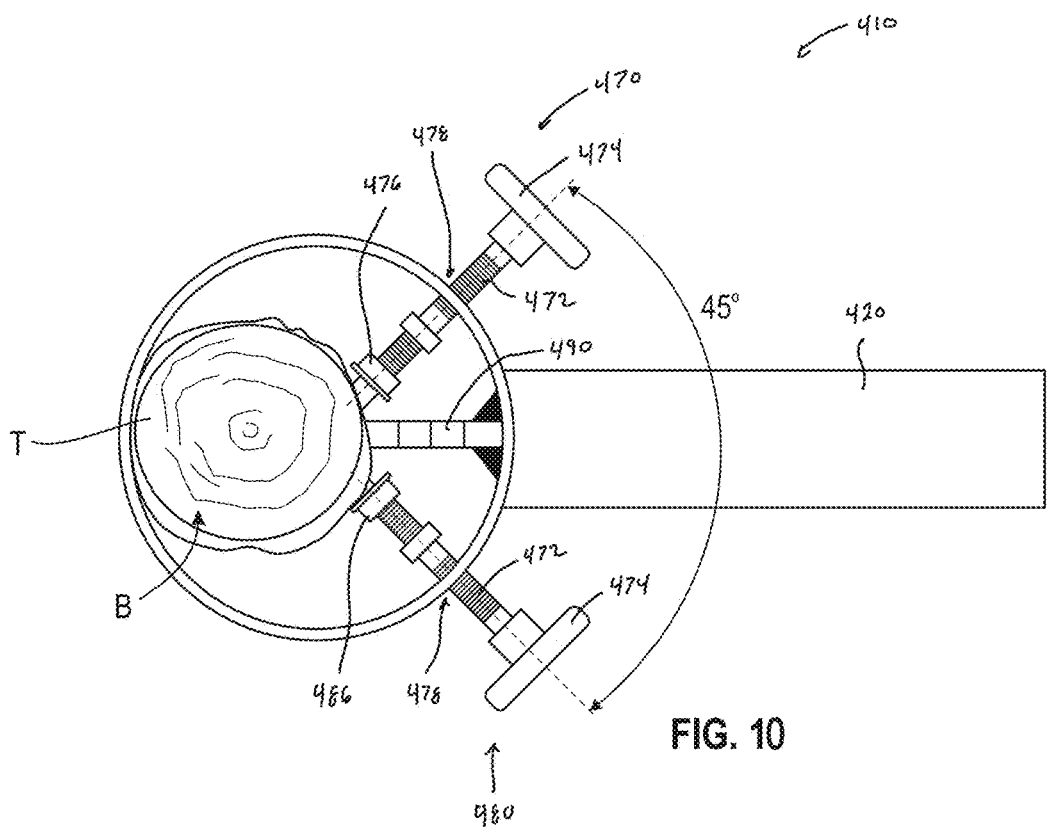
FIG. 10 is a top view of a third embodiment of a hitch mounted tree carrier, showing a holiday tree residing within the hitch mounted tree carrier.
Figure 11:
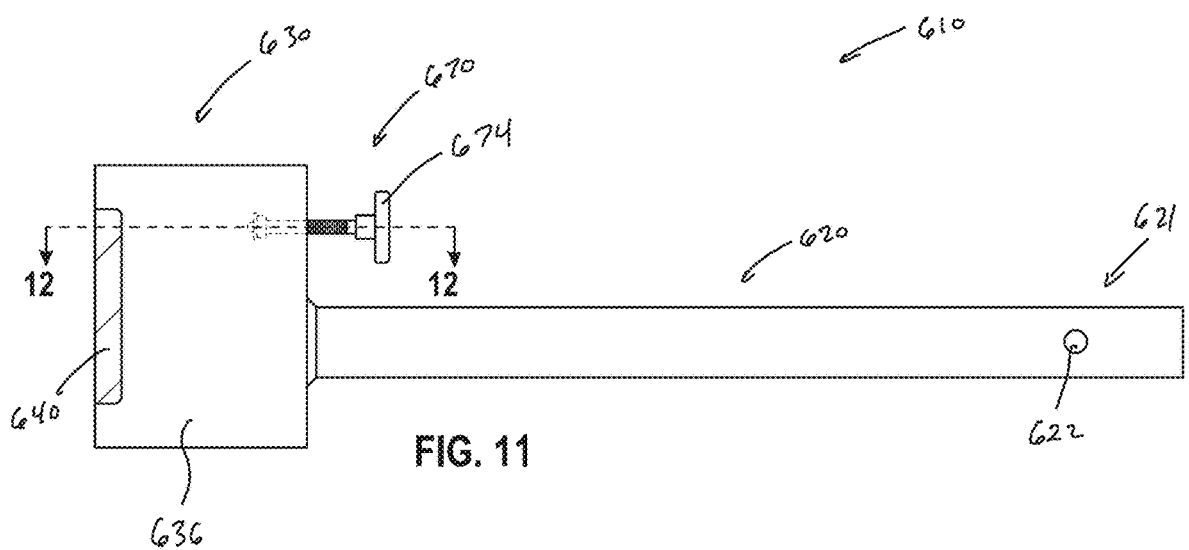
FIG. 11 is side view of a fourth embodiment of a hitch mounted tree carrier.
Figure 12:
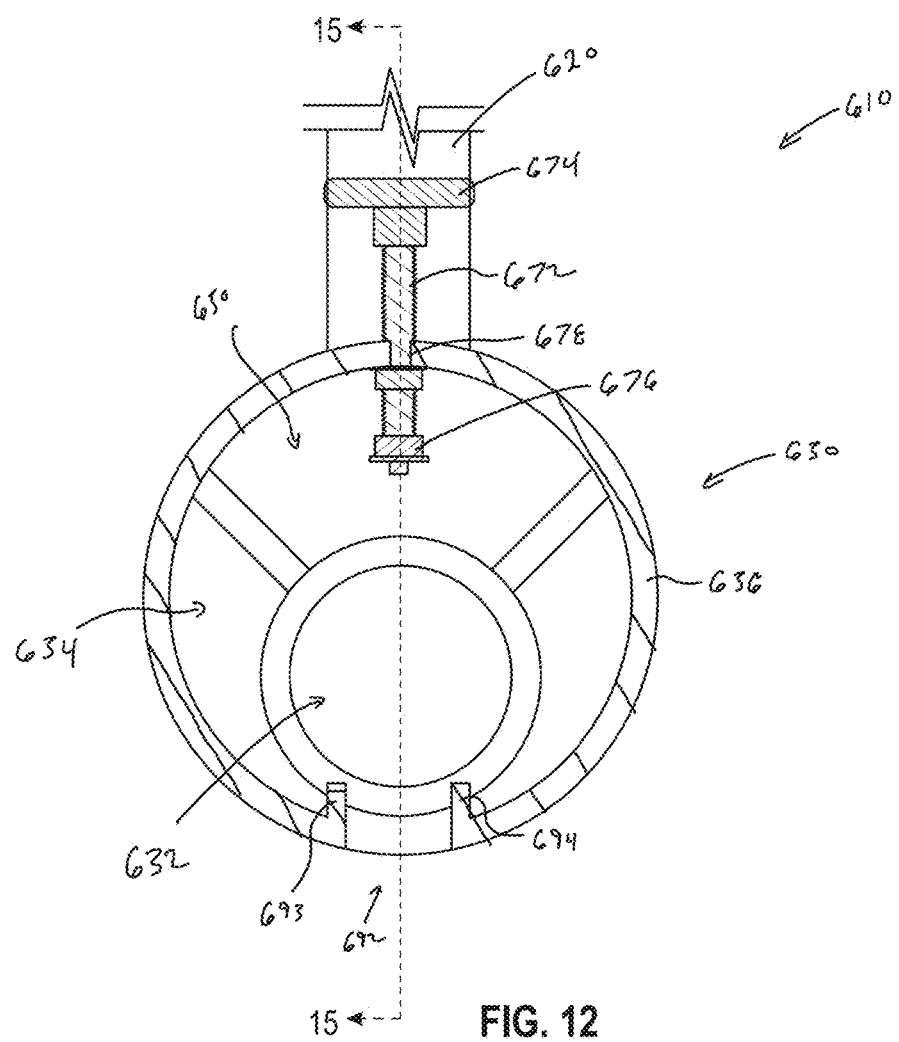
FIG. 12 is a top view of the hitch mounted tree carrier of FIG. 11.
Figure 13:
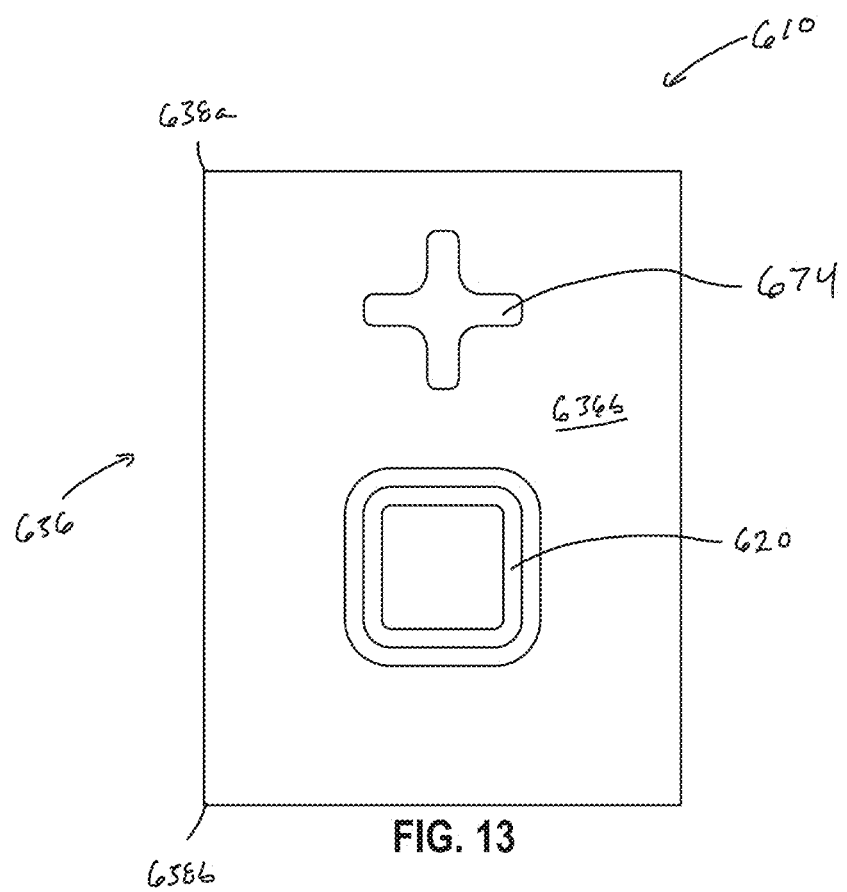
FIG. 13 is a front end view of the hitch mounted tree carrier of FIG. 11.
Figure 14:
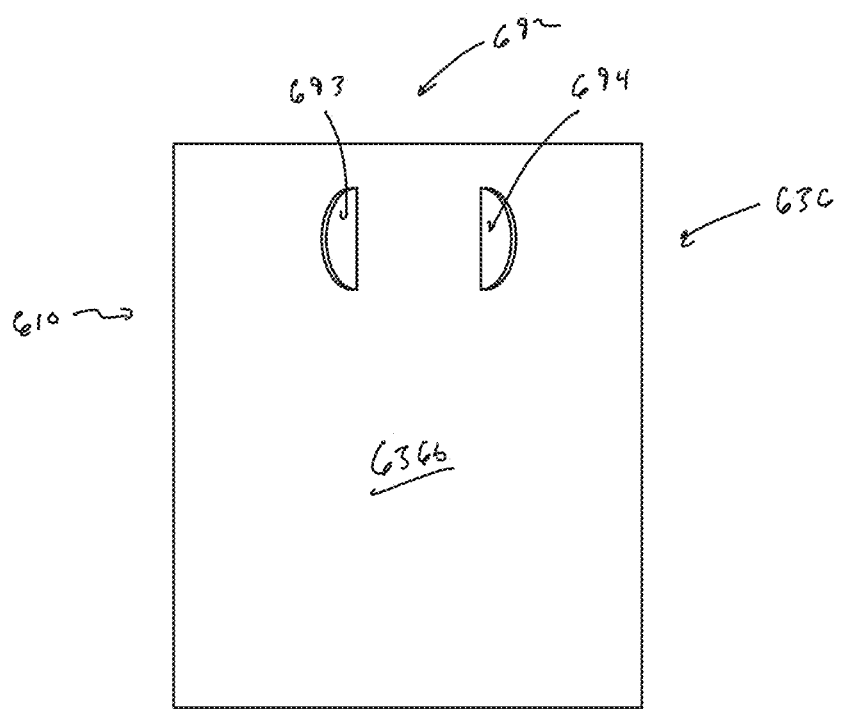
FIG. 14 is a rear end view of the hitch mounted tree carrier of FIG. 11.
Figure 15:
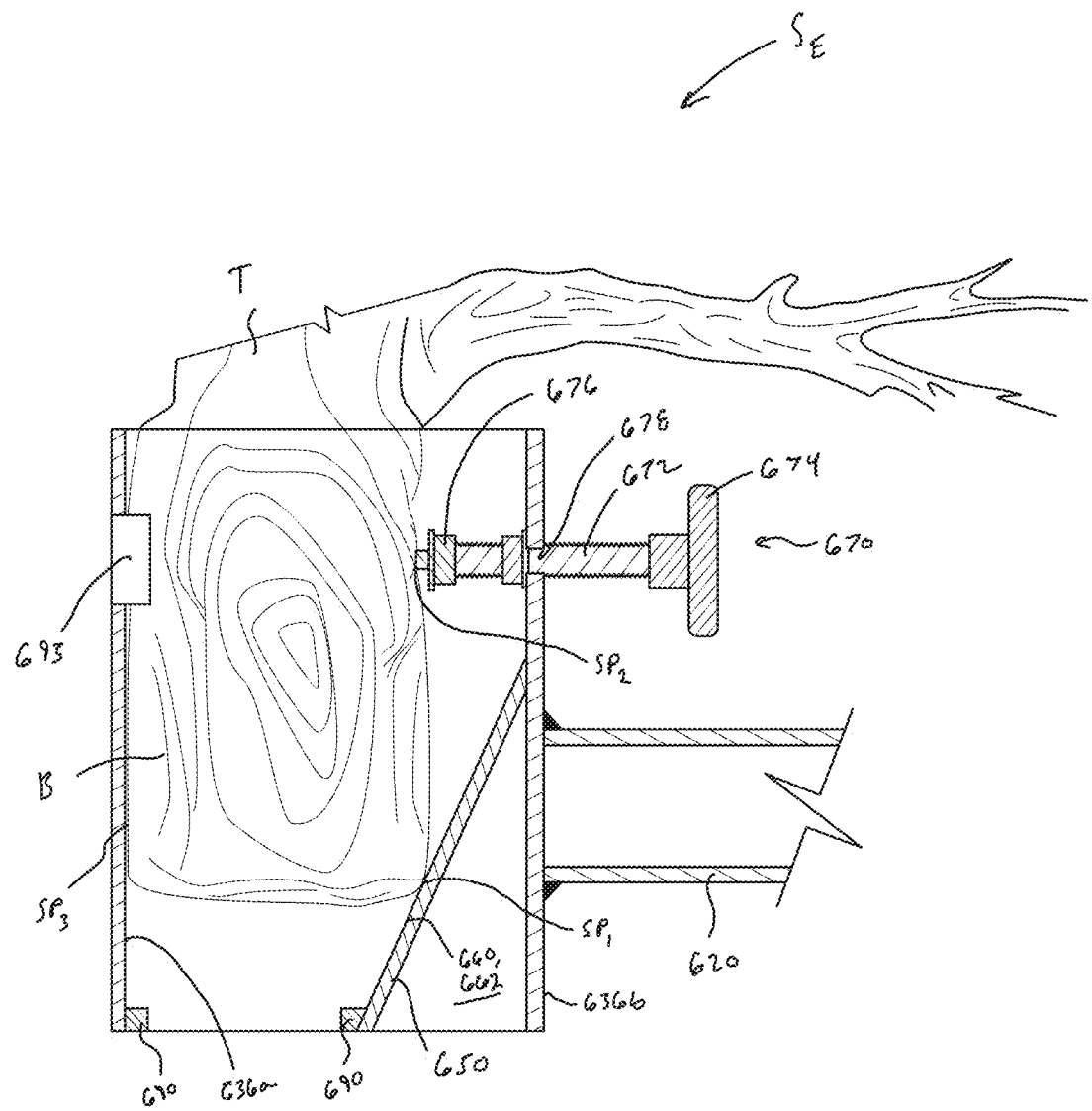
FIG. 15 is a cross-sectional view of the hitch mounted tree carrier taken along line 15-15 of FIG. 12, further including a holiday tree is residing within the hitch mounted tree carrier.

Similar to the carrier 10, FIG. 10 shows an additional embodiment of the carrier 410. For the sake of brevity, the above disclosure in connection with carrier 10 will not be repeated below, but it should be understood that across embodiments like numbers represent like structures. In particular, like structure have like reference numbers that are separated by an interval of 400. For example, the disclosure relating to the receptacle 30 applies in equal force to receptacle 430. Moreover, it is to be understood that any one or more features of the carrier 10 can be used in conjunction with those disclosed regarding the carrier 410, and that anyone or more features of the carrier 410 can be used in conjunction with those disclosed regarding the carrier 10.

The carrier 410 omits the internal wedge 50, 250 but includes a first securement assembly 470 and a second securement assembly 480 that are angularly offset from each other (e.g., at 45 degrees from each other). The first and second adjustable fastener assemblies 470, 480 are also angularly offset from the member 420 instead of being aligned with the member 420. As described above the first and second adjustable fastener assemblies 470, 480 include the elongated fastener 472, 482, the external actuator 474, 484 that is configured to be grasped and actuated by a user, the internal engagement member 476, 486, and a threaded receiver 478, 488. The first and second adjustable fastener assemblies 470, 471 are also angularly offset from the retaining element 490, upon which the lower surface of the trunk B rests while the tree T is in either the supported state S$_{SU}$ to an engaged state S$_E$.

Similar to the carrier 10, FIGS. 11-15 shows an additional embodiment of the carrier 610. For the sake of brevity, the above disclosure in connection with carrier 10 will not be repeated below, but it should be understood that across embodiments like numbers represent like structures. In particular, like structure have like reference numbers that are separated by an interval of 600. For example, the disclosure relating to the receptacle 30 applies in equal force to receptacle 630. Moreover, it is to be understood that any one or more features of the carrier 10 can be used in conjunction with those disclosed regarding the carrier 610, and that anyone or more features of the carrier 610 can be used in conjunction with those disclosed regarding the carrier 10.

The carrier 610 features a plurality of rear projections 692, wherein said plurality of projections 692 includes a first inner projection 693 and a second inner tab 694. The first inner projection 693 and second inner projection 694 alternatively fasten the tree T into the receptacle 630 and prevent the tree T from moving when it is secured into the receptacle 630 with the securement assembly 670. In particular, when the elongated fastener is tightened by the user, the tree T is pushed against the first inner projection 693 and second inner projection 694, such that the first inner projection 693 and second inner projection 694 dig into the bark of the tree T and prevent the tree T from yawing in the carrier 610.

Figure 16:
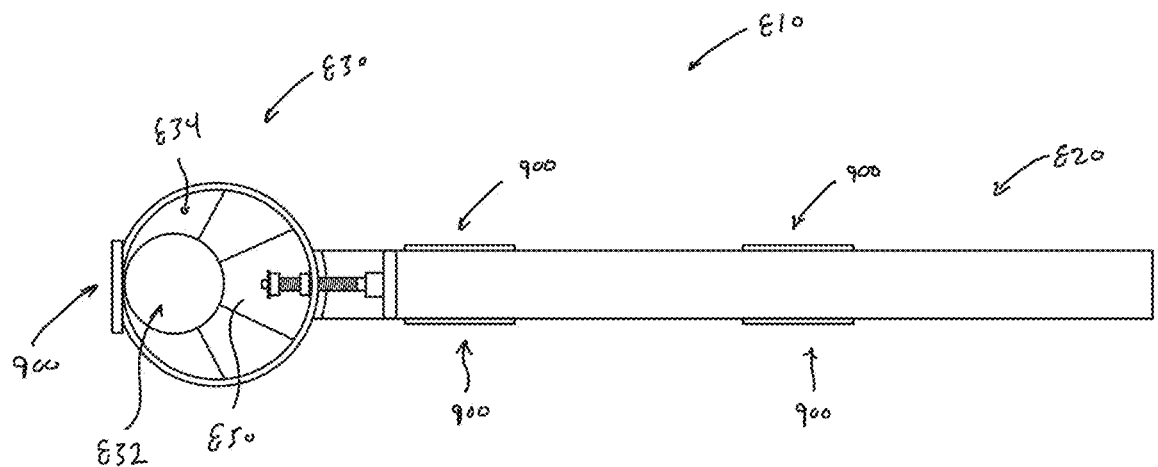
FIG. 16 is a top view of a fifth embodiment of a hitch mounted tree carrier, wherein the carrier includes safety accessories.

Similar to the carrier 10, FIG. 16 shows an additional embodiment of the carrier 810. For the sake of brevity, the above disclosure in connection with carrier 10 will not be repeated below, but it should be understood that across embodiments like numbers represent like structures. In particular, like structure have like reference numbers that are separated by an interval of 800. For example, the disclosure relating to the receptacle 30 applies in equal force to receptacle 830. Moreover, it is to be understood that any one or more features of the carrier 10 can be used in conjunction with those disclosed regarding the carrier 810, and that anyone or more features of the carrier 810 can be used in conjunction with those disclosed regarding the carrier 10.

The hitch mounted tree carrier 810 may be equipped with electrical devices 900, such as external brake light, cameras, sensors (e.g., radar, LiDAR, or other light/sound based sensors), that are mounted to the rear of the receptacle 830 and/or sides of the elongated member 820. Said electrical devices 900 may be: (i) battery operated, (ii) capable of connecting to the car via a wireless protocol (e.g., Bluetooth, Wi-Fi, etc.), and/or (iii) connected into the vehicle's wiring harness using the trailer light receptacle. As such, the electrical devices 900 may be capable of sending and/or receiving information from the vehicle 500. This configuration may be beneficial to enable other vehicles to see when the vehicle with the tree T is breaking because said tree T may obscure part or all of the vehicle's break lights. Additionally, sensors and/or cameras may help the user park or maneuver their vehicle 500 when the carrier 810 is coupled thereto.

Additionally, the hitch mounted tree carrier 810 may include to pressure or force gauge that is coupled to the side wall 36 and is to configured to inform a user when the second force or securement force F$_S$ that is applied by the securement assembly 870 exceeds a predefined threshold indicate proper securement of the tree T in the receptacle 30. Indication that the securement force F$_S$ exceeds a predefined threshold may be provided to the user via a visual sign or an sound. This configuration is beneficial because it informs the user when the carrier and tree T are in the engaged state S$_E$. In other embodiments, the securement assembly may be automatic or electronic. Other sensors or technology may be used to help ensure that the tree T is properly affixed in the carrier 10.

Figure 17:
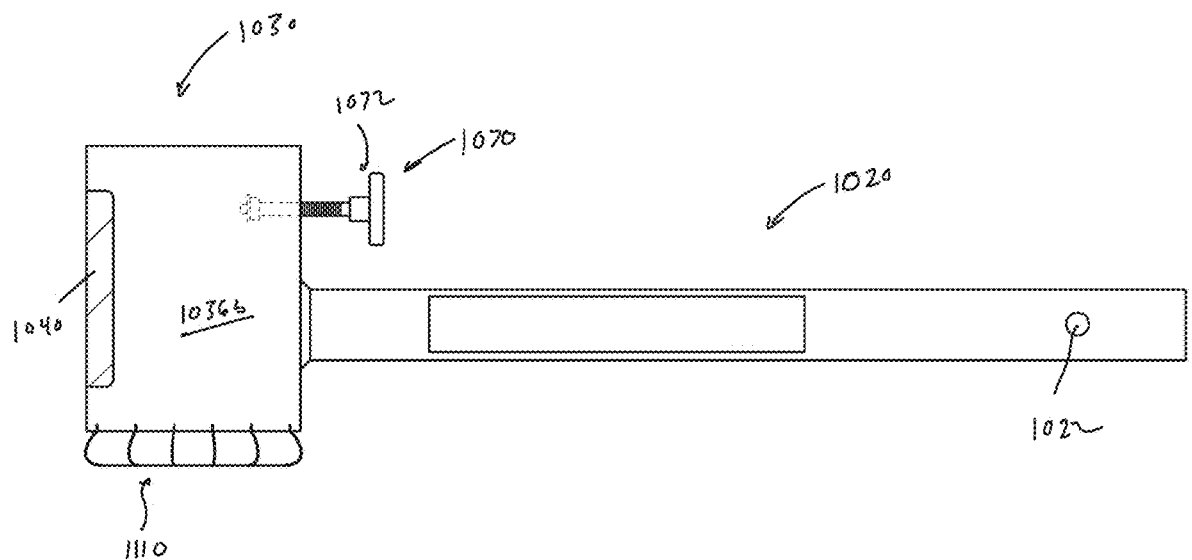
FIG. 17 is a side view of a sixth embodiment of a hitch mounted tree carrier, wherein the carrier includes a second embodiment of a retaining element.

Similar to the carrier 10, FIG. 17 shows an additional embodiment of the carrier 1010. For the sake of brevity, the above disclosure in connection with carrier 10 will not be repeated below, but it should be understood that across embodiments like numbers represent like structures. In particular, like structure have like reference numbers that are separated by an interval of 1000. For example, the disclosure relating to the receptacle 30 applies in equal force to receptacle 1030. Moreover, it is to be understood that any one or more features of the carrier 10 can be used in conjunction with those disclosed regarding the carrier 1010, and that anyone or more features of the carrier 1010 can be used in conjunction with those disclosed regarding the carrier 10. In this embodiment, the carrier 1010 replaces the retaining element 90 from carrier 10 with a flexible net 1110. Said flexible net 1110 may have advantages over the rod 92 configuration because it allows the base B of the tree T to be inserted past the lower edge 1038*b* of the side wall 1036, but still provides some limit for how far the tree T can be inserted into the receptacle 1030 to help ensure that there is sufficient clearance between the tree T and the ground that the vehicle drives over.

Figure 18:
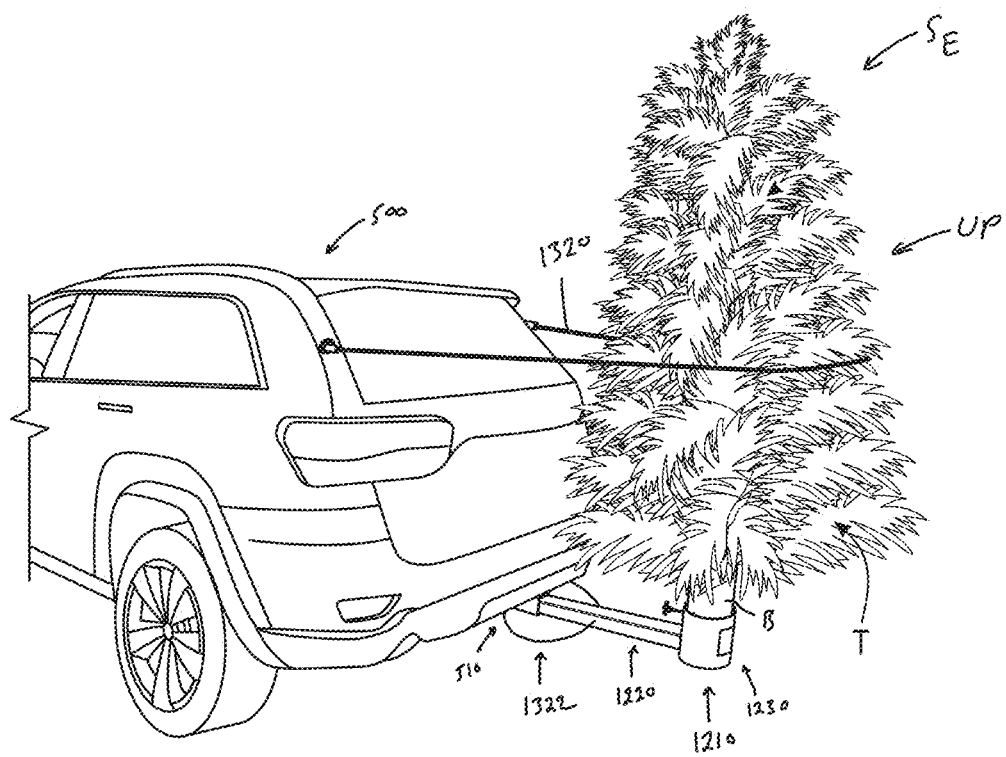
FIG. 18 is a perspective the hitch mounted tree carrier with a holiday tree is residing within the hitch mounted tree carrier and a first embodiment of a tree securement assembly.
Figure 19:
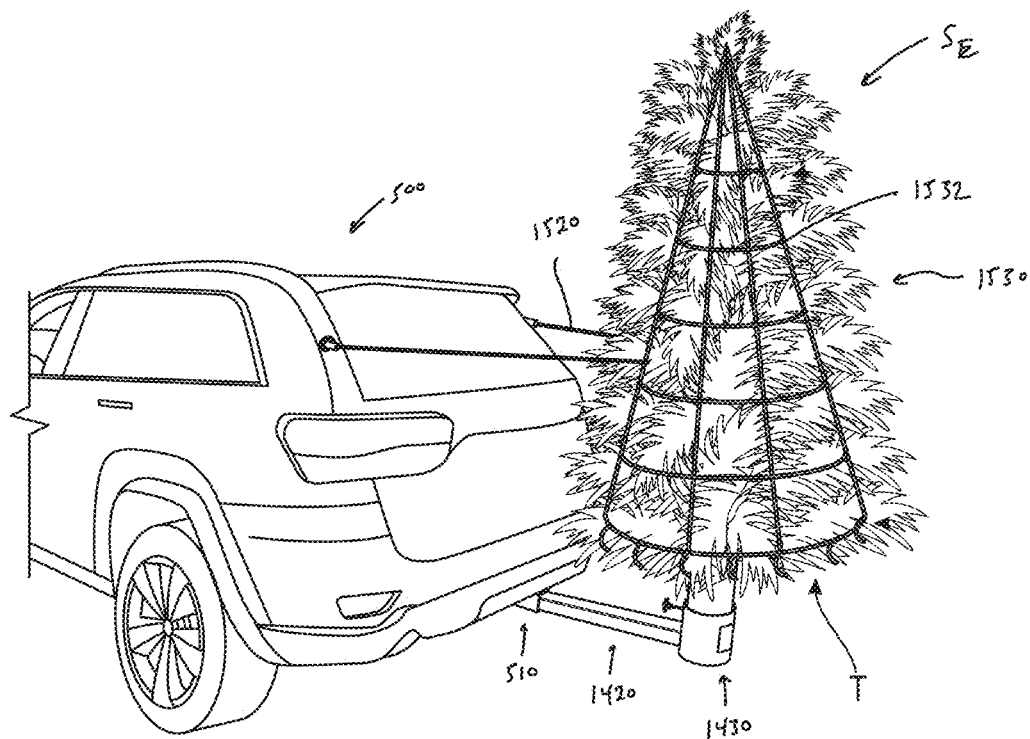
FIG. 19 is a perspective the hitch mounted tree carrier with a holiday tree is residing within the hitch mounted tree carrier and a second embodiment of a tree securement assembly.

Similar to the carrier 10, FIGS. 18-19 show additional embodiments of the carrier 1210, 1410. For the sake of brevity, the above disclosure in connection with carrier 10 will not be repeated below, but it should be understood that across embodiments like numbers represent like structures. In particular, like structure have like reference numbers that are separated by intervals of 1200 or 1400. For example, the disclosure relating to the receptacle 30 applies in equal force to receptacle 1230 or 1430. Moreover, it is to be understood that any one or more features of the carrier 10 can be used in conjunction with those disclosed regarding the carriers 1210, 1410 disclosed in FIGS. 18-19, and that anyone or more features of the carriers 1210, 1410 disclosed in FIGS. 18-19 can be used in conjunction with those disclosed regarding the carrier 10.

FIG. 18 shows a hitch mounted tree carrier 1210, which includes with a tether 1320 to secure the upper part of the tree T to the vehicle 500. The tether 1320 may comprise bungee cords, ropes, lines, hooks, wire, tape, or any attachment means coupled to the vehicle's (e.g., trunk, bumper, roof rack, etc.) or the carrier 1210. Said tether 1320 prevents the tree T from yawing back and forth as the vehicle drives down the road. In addition to tether 1320, the carrier 1210 also includes leads 1322 that provide a secondary method of securing the carrier 1210 to the vehicle 500. Said leads 1322 are designed to help ensure that the carrier 1210 remains with the vehicle 500, even if the pin was not properly placed through the openings in the hitch 510 and carrier 22. Like the hitch mounted tree carrier 1210, hitch mounted tree carrier 1410 of FIG. 19 includes a netting system 1530 that can be used in conjunction with tether 1520. Said netting system 1520 is comprised of a netting bag 1532 that secures the branches and needles of the tree T in an enclosed encasement to prevent them from falling off during transport. The netting bag 1532 consists of a large perforated bag that is placed over the tree T once the tree T is secured to the vehicle 500 with tether 1520.

Figure 20:
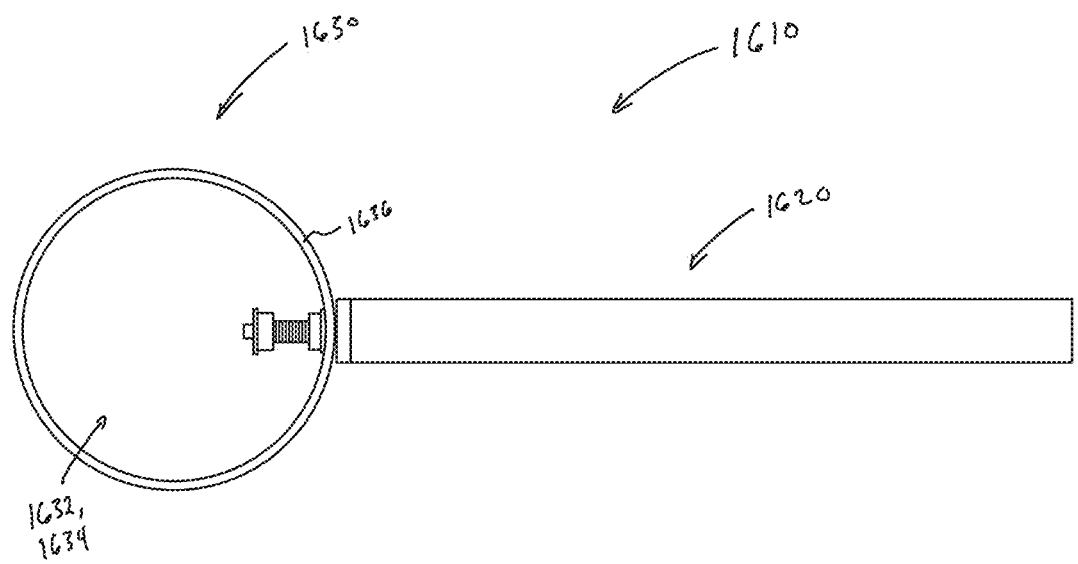
FIG. 20 is a top view of a sixth embodiment of a hitch mounted carrier, wherein the receptacle is dimensioned to receive a nursery bucket.

Similar to the carrier 10, FIG. 20 show an additional embodiment of the carrier 1610. For the sake of brevity, the above disclosure in connection with carrier 10 will not be repeated below, but it should be understood that across embodiments like numbers represent like structures. In particular, like structure have like reference numbers that are separated by an interval of 1600. For example, the disclosure relating to the receptacle 30 applies in equal force to receptacle 1630. Moreover, it is to be understood that any one or more features of the carrier 10 can be used in conjunction with those disclosed regarding the carrier 1610 disclosed in FIG. 20, and that anyone or more features of the carrier 1610 disclosed in FIG. 20 can be used in conjunction with those disclosed regarding the carrier 10. In this embodiment, the size of the receptacle 30 has been increased from being between 2 inches to 10 inches to a receptacle 1630 that is between 10 inches to 18 inches. This larger diameter receptacle 1630 is designed to receive a large cylindrical shape, such as a nursery bucket.

Figure 21:
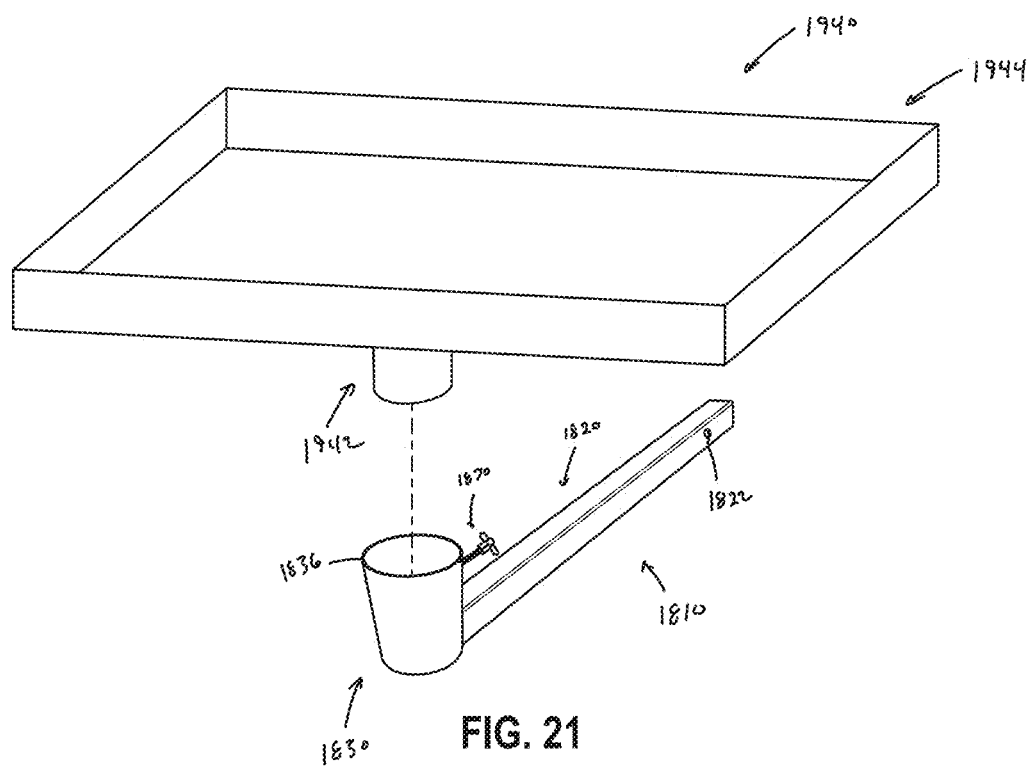
FIG. 21 is a perspective view of the hitch mounted carrier, wherein a platform is configured to be coupled to the hitch mounted carrier.

Similar to the carrier 10, FIG. 21 show an additional embodiment of the carrier 1810. For the sake of brevity, the above disclosure in connection with carrier 10 will not be repeated below, but it should be understood that across embodiments like numbers represent like structures. In particular, like structure have like reference numbers that are separated by an interval of 1800. For example, the disclosure relating to the receptacle 30 applies in equal force to receptacle 1830. Moreover, it is to be understood that any one or more features of the carrier 10 can be used in conjunction with those disclosed regarding the carrier 1810 disclosed in FIG. 21, and that anyone or more features of the carrier 1810 disclosed in FIG. 21 can be used in conjunction with those disclosed regarding the carrier 10. In this embodiment, the hitch mounted carrier 1810 may have an insert 1940 that fits within the receptacle 1830. The insert 1940 has a base 1942 that is sized to fit the inside diameter of the receptacle 1830. The insert 1940 also comprises a top 1944 that creates a surface that is larger than the carrier 1810 itself, which creates additional transportation surface area for larger, heavy, bulky, or other difficult to transport materials. Examples of materials that could be transported include but are not limited to: vacation supplies, building supplies, home supplies, etc.

While this disclosure includes several embodiments in many different forms, there is shown in the drawings and will herein be described in detail particular embodiments with the understanding that the present disclosure is to be considered as an exemplification of the principles of the disclosed methods and systems, and is not intended to limit the broad aspects of the disclosed concepts to the embodiments illustrated. As will be realized, the disclosed methods and systems are capable of other and different configurations, and several details are capable of being modified all without departing from the scope of the disclosed methods and systems. Accordingly, the drawings and detailed description are to be regarded as illustrative in nature, not restrictive or limiting.

It is to be understood that the invention is not limited to the exact details of construction, operation, exact materials or embodiments shown and described, as obvious modifications and equivalents will be apparent to one skilled in the art. While the specific embodiments have been illustrated and described, numerous modifications come to mind without significantly departing from the spirit of the invention. For example, the wedge 50, securement assembly 70, and/or retaining element 90 may be omitted. The carrier 10, 210, 410, 610, 810, 1010, 1210, 1410, 1610, 1810 may be made from metal, plastic, or any other known material and may be formed using injection molding, thermoforming, gas-assisted molding, reaction-injection molding, additive manufacturing, 3D printing, substantive manufacturing, or any other similar method.

While some implementations have been illustrated and described, numerous modifications come to mind without significantly departing from the spirit of the disclosure; and the scope of protection is only limited by the scope of the accompanying claims.

Headings and subheadings, if any, are used for convenience only and are not limiting. The word exemplary is used to mean serving as an example or illustration. To the extent that the term includes, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Numerous modifications to the present disclosure will be apparent to those skilled in the art in view of the foregoing description. Preferred embodiments of this disclosure are described herein, including the best mode known to the inventors for carrying out the disclosure. It should be understood that the illustrated embodiments are exemplary only, and should not be taken as limiting the scope of the disclosure.

What is claimed is:

1. A hitch mounted tree carrier to secure a tree for transport behind a motor vehicle, the hitch mounted tree carrier comprising:
    an elongated member configured to be removably received by a motor vehicle hitch;
    a receptacle having: (i) a front portion, (ii) a rear portion, (iii) an upper opening having a first opening size, and (iv) a lower opening having a second opening size wherein the front portion is affixed to the elongated member, and the lower opening size is at least 30% smaller than the upper opening size;
    a wedge positioned in the receptacle and configured to apply a first force on a first extent of a tree trunk when the tree is inserted into the receptacle, the first force being directed away from the front portion of the receptacle and towards the rear portion of the receptacle; and,
    a securement assembly extending into the receptacle and configured to apply a second force on a second extent of the tree trunk, the second force being directed away from the front portion of the receptacle and towards the rear portion of the receptacle.

2. The hitch mounted tree carrier of claim 1, wherein a gravitational force that is exerted on the tree trunk is a direction that is substantially perpendicular to the second force.

3. The hitch mounted tree carrier of claim 1, wherein an extent of an aerodynamic drag force that is produced when the motor vehicle is driven in a forward direction is substantially perpendicular to a major axis of the tree trunk.

4. The hitch mounted tree carrier of claim 1, wherein the wedge includes a sloped wall configured to interact with an extent of the trunk of the tree to provide a first support point, and wherein when the tree is in a engaged state $S_E$, the wedge applies a third force at the first support point.

5. The hitch mounted tree carrier of claim 4, wherein the third force is directed towards the rear portion of the receptacle.

6. The hitch mounted tree carrier of claim 4, wherein the second force and the third force are substantially aligned.

7. The hitch mounted tree carrier of claim 1, wherein the securement assembly is configured to engage a second portion of the tree trunk, and wherein the engagement between the securement assembly and the second portion of the tree trunk provides a second support point for the tree.

8. The hitch mounted tree carrier of claim 1, wherein the securement assembly includes a force gauge configured to inform a user when the second force that is applied by the securement assembly exceeds a predefined threshold indicate proper securement of the tree.

9. The hitch mounted tree carrier of claim 1, further including a retaining element coupled to a side wall of the receptacle, the retaining element configured to prevent the tree from extending past a lower edge of the receptacle when the tree is inserted into said receptacle.

10. A hitch mounted carrier securing a tree for transport behind a motor vehicle, the hitch mounted carrier comprising:
    an elongated member having tubular configuration and a vehicle mating portion;
    a receptacle affixed to the elongated member and having a side wall, wherein said receptacle is configured to receive a trunk of a tree;
    a securement assembly that extends through an extent the side wall of the receptacle, the securement assembly being configured to engage with a first extent of the trunk of the tree to secure said tree in the receptacle in an engaged state $S_E$; and
    a wedge is coupled to an inner surface of the side wall of the receptacle and having a sloped wall with a concave external surface that is configured to engage with a second extent of the trunk of the tree.

11. The hitch mounted tree carrier of claim 10, wherein the wedge is configured to apply a force on the extent of the trunk of the tree that is directed away from the elongated member and towards a rear portion of the receptacle.

12. The hitch mounted tree carrier of claim 10, wherein the engagement between the wedge and the second extent of the trunk provides a first support point for the tree in the engaged state $S_E$.

13. The hitch mounted tree carrier of claim 12, wherein the engagement between the securement assembly and the first extent of the trunk of the tree provides a second support point for the tree.

14. The hitch mounted tree carrier of claim 10, wherein the securement assembly is configured to apply a force on the first extent of the trunk of the tree that is directed away from a front portion of the receptacle and towards a rear portion of the receptacle.

15. The hitch mounted tree carrier of claim 10, wherein the securement assembly is configured to engage the first extent of the trunk to provide a first support point for the tree in the engaged state $S_E$; and,
    wherein the receptacle includes a wedge configured to engage with a second extent of the trunk of the tree to provide a second support point for the tree is in the engaged state $S_E$.

16. The hitch mounted tree carrier of claim 10, further including a retaining element coupled to the side wall of the receptacle, the retaining element configured to prevent the tree from extending past a lower edge of the receptacle when the tree is inserted into said receptacle.

17. The hitch mounted tree carrier of claim 10, further comprising a brake light that is: (i) mechanically coupled to the rear portion of the receptacle, and (ii) electrically coupled to the vehicle.

18. The hitch mounted tree carrier of claim 1, wherein the wedge includes a concave external surface that is configured to engage with a portion of the first extent of the trunk of the tree.

19. The hitch mounted tree carrier of claim 10, wherein the receptacle includes an upper opening having a first opening size and a lower opening having a second opening size, and wherein the lower opening size is at least 30% smaller than the upper opening size.

20. The hitch mounted tree carrier of claim 10, wherein the securement assembly includes a force gauge configured to inform a user when a force that is applied by the securement assembly exceeds a predefined threshold.

* * * * *